United States Patent
Brotz

[19]

[11] Patent Number: 6,115,006
[45] Date of Patent: Sep. 5, 2000

[54] ROTATING DISPLAY DEVICE AND METHOD FOR PRODUCING A THREE-DIMENSIONAL REAL IMAGE

[76] Inventor: Gregory R. Brotz, P.O. Box 1322, Sheboygan, Wis. 53081

[21] Appl. No.: 08/919,628

[22] Filed: Aug. 28, 1997

Related U.S. Application Data

[63] Continuation-in-part of application No. 08/416,175, Apr. 4, 1995, Pat. No. 5,663,740, which is a continuation-in-part of application No. 08/184,973, Jan. 21, 1994, abandoned, which is a continuation-in-part of application No. 07/866,988, Apr. 10, 1992, abandoned, which is a continuation-in-part of application No. 07/786,564, Nov. 1, 1991, abandoned, which is a continuation-in-part of application No. 07/454,389, Dec. 21, 1989, Pat. No. 5,072,215, which is a continuation-in-part of application No. 07/182,920, Apr. 18, 1988, Pat. No. 4,896,150.

[51] Int. Cl.[7] .................................................. G09G 3/22
[52] U.S. Cl. .................................. 345/6; 345/31; 348/51
[58] Field of Search .................................. 345/31, 139, 6; 342/180; 348/51, 54; 367/72

[56] References Cited

U.S. PATENT DOCUMENTS

| | | |
|---|---|---|
| 3,154,636 | 10/1964 | Schwertz . |
| 3,202,985 | 8/1965 | Perkins et al. . |
| 3,204,238 | 8/1965 | Skellet . |
| 3,323,126 | 5/1967 | Malone et al. . |
| 4,160,973 | 7/1979 | Berlin, Jr. . |
| 5,162,787 | 11/1992 | Thompson et al. . |

*Primary Examiner*—Jeffery Brier
*Attorney, Agent, or Firm*—William Nitkin

[57] ABSTRACT

A display device and method for producing a three-dimensional visual effect having a viewing area with a front and a depth with a rotating spiral screen disposed within the viewing area with the screen facing the front of the viewing area. A plurality of independently controlled light-producing elements are disposed on the spiral screen. Computerized image programs control the activation of selected of the plurality of light-producing elements in a desired pattern. The rotating spiral screen can also be a television screen.

10 Claims, 1 Drawing Sheet

ROTATING DISPLAY DEVICE AND METHOD FOR PRODUCING A THREE-DIMENSIONAL REAL IMAGE

This application is a continuation-in-part of my previous application for a Rotating Display Device Producing a Three-dimensional Real Image filed Apr. 4, 1995 Ser. No. 08/416,175 now U.S. Pat. No. 5,663,740, which was a continuation-in-part of my previous application for Display Producing a Three-dimensional Effect, Ser. No. 08/184,973 filed Jan. 21, 1994 now abandoned, which was a continuation-in-part of my previous application under the same title, Ser. No. 07/866,988 filed Apr. 10, 1992 now abandoned, which was a continuation-in-part of my previous application for Three-dimensional Imaging System, Ser. No. 07/786,564 filed Nov. 1, 1991 now abandoned which was a continuation-in-part of my previous application entitled Three-dimensional Imaging System, Ser. No. 07/454,389 filed Dec. 21, 1989 now U.S. Pat. No. 5,072,215 which was a continuation-in-part of my previous application under the same title having Ser. No. 07/182,920 filed Apr. 18, 1988 now U.S. Pat. No. 4,896,150.

BACKGROUND OF THE INVENTION

1. Field of the Invention

The device and method of this invention resides in the area of visual displays and more particularly relates to a device and method for producing a visual three-dimensional impression and/or real image directly observable by a viewer without the use of 3-D viewers or 3-D glasses.

2. Description of the Prior Art

Many devices yielding a three-dimensional-like image such as a hologram or 3-D viewers are known in the art. Some of these devices require two images which are observed by the viewer through a stereo viewer which recomposes the two images into an apparent three-dimensional image. The Applicant in U.S. Pat. Nos. 4,896,150 and 5,072,215 has disclosed three-dimensional viewing chambers.

Three-dimensional display devices incorporating rotating flat screens are found in the art, being described in the Schwertz Patent No. 3,154,636 and in the Berlin Patent No. 4,160,973 which devices utilize a planar screen which rotates around an axis being attached to an edge of the screen. These devices use LEDs or discrete electroluminescing areas to make the rotating planar screen generate a two-dimensional image that changes according to its position during rotation. A drawback to such devices is that from any vantage point a dark line forms down the center of the image produced due to the thickness of the screen at a point during its rotating when it is directly facing the viewer. Also, complex electronics are required to compensate for the virtual narrowing and widening of the screen and the related change in perspective as the screen sweeps from its position when its edge is facing the viewer to a position 90 degrees therefrom when the surface of the screen plane is facing the viewer. Rotating curved screens are used in Skellett, U.S. Pat. No. 3,204,238 as a radar display. A spherical spiral screen is used in Perkins, U.S. Pat. No. 3,202,985 also as a radar display.

SUMMARY OF THE INVENTION

The device of this invention utilizes a screen disposed in a viewing chamber which screen moves in such viewing chamber so that portions of the screen at points in time occupy every point of the display volume of the viewing chamber. When display information is provided to the screen for areas of the screen to be illuminated, the movement of the screen through space produces the impression to an observer that the image has depth or a three-dimensional quality.

The display device of this invention uses a rotating spiral screen having image-producing means such as a plurality of independently controlled light-producing elements disposed on its forward-facing surface. The spiral screen continuously rotates along its vertical axis or shaft in the viewing chamber at a fast rate of rotation, and positions on the screen surface eventually pass all points in the display volume during each rotation. Such rotational movement provides a three-dimensional effect to any image formed on the spiral screen as it is viewed from the front of the viewing chamber.

BRIEF DESCRIPTION OF THE DRAWINGS

The FIGURE illustrates a perspective view of the display device of this invention showing a spiral screen mounted on a shaft which screen can rapidly rotate.

DESCRIPTION OF THE PREFERRED EMBODIMENT(S)

Figure 1:
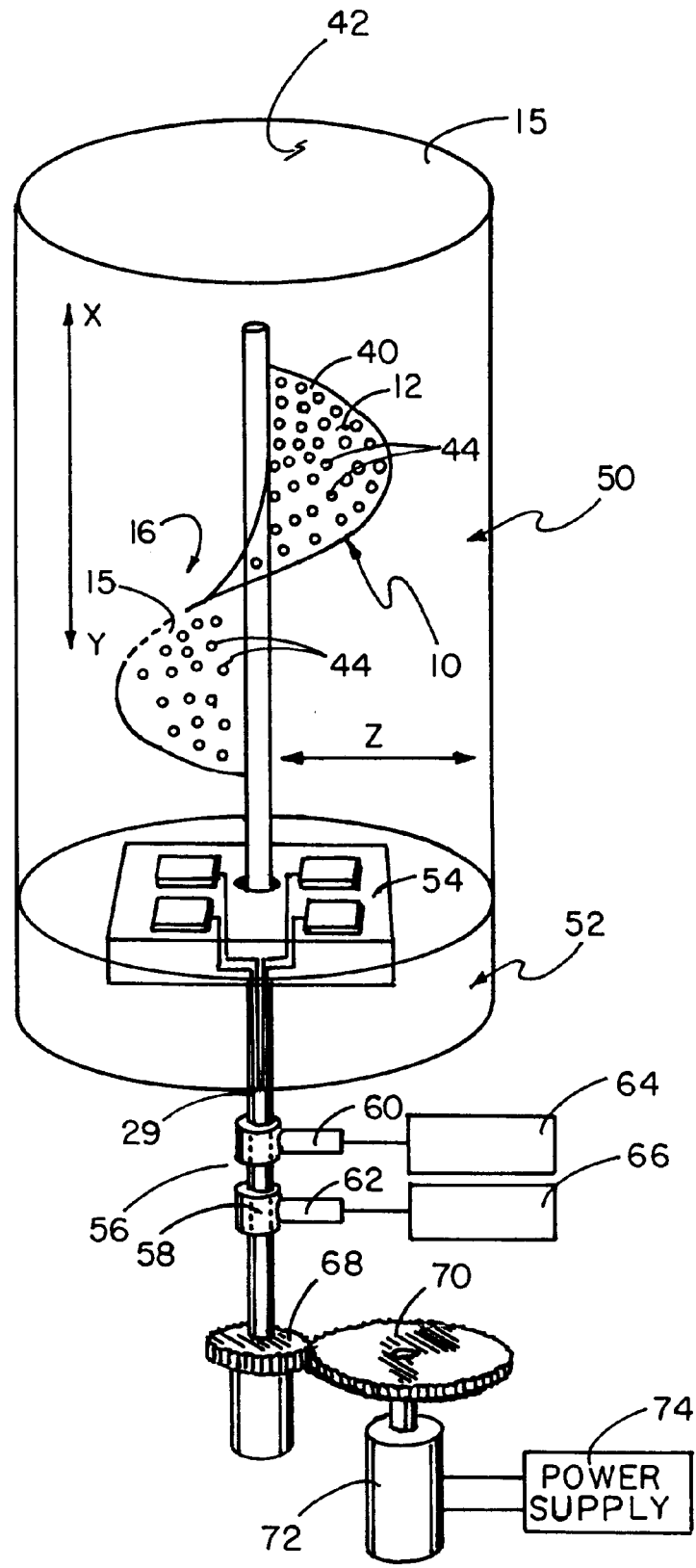

The FIGURE illustrates display screen 10 having on its upper surface 12 visible image-producing means 44 (IPMs) such as, for example, an FED (Field Emission Display) or in another example a plurality of independently controlled light-emitting diodes (LEDs), each forming illuminated and non-illuminated spots to produce an image. An FED has been compared to a miniature cathode ray tube disposed between two plates. In an FED, each pixel can have a plurality of emitter cones formed on a lower plate, each with an emitting microtip. A transparent phosphor-coated upper face plate is positioned over the array of cones. In some cones picture resolution can be improved by the use of a focus grid to collimate the electrons drawn off the microtips. Like a conventional cathode ray tube electrons are liberated from the microtips acting as the cathode and impinge on the phosphors of the transparent face plate to produce an illuminated spot. Unlike conventional cathode ray tubes where an electron gun is disposed a distance from the screen, requiring a high vacuum to aid in passage of the electrons, FEDs with their extremely short electron travel distance can be made of much thinner materials and require a very low anode voltage. FEDs are an improvement over other types of flat panel displays in that the viewing angle is greatly increased. Thus the use in this invention of FEDs allows for a real image to be formed on the moving surface, pixel by pixel, with each pixel producing its own light by its activated phosphors. When using FEDs even color displays are possible. Solid state display screens are also known which provide about 150,000 picture elements being LEDs on a large printed circuit to compose a pictorial image such as a television image. Each LED represents one picture element or pixel. Also useful are integrated circuit chips with multiple lasers thereon which can be activated to act as IPMs when placed on the spiral screen.

In some embodiments back surface 16 of screen 10 can have the same IPMs 44 thereon as disposed on front surface 12. Screen 10 is rotated within viewing chamber 15, as described in detail below. The rotating screen can rotate at a constant velocity, and the input of signals to the IPMs can start at the same point in rotation to form a complete image on the screen before the next input of signals starts to form the next screen image in sequence. The screen images produced by the sequential activation of the IPMs is done at a rate that will cause a constant three-dimensional image to appear. It should be further noted that although the device herein is illustrated as being disposed within a chamber, in many embodiments a chamber is not necessary to contain the rotating screen since the screen produces its image directly thereon. All that is necessary is a viewing area having a front, back and depth for the rotating spiral screen to rotate in. In some instances a transparent cover may be desirable for safety reasons to prevent inadvertent contact with the rotating screen such as by children reaching toward the three-dimensional image.

Television camera analog signals can be converted to digital signals which are directed to control each IPM. In the device of this invention the images desired to be displayed can be controlled by a device producing such a digital signal. Properly processed television broadcast images can be utilized in the device of this invention produced in one embodiment by multiple cameras to provide image data to such IPM devices appropriate for all positions between points X, Y and Z within the viewing chamber.

In one embodiment the drive system can utilize a servo-type motor 72 having a phase synchronization controller as described further below. The controlling signal of the servo motor can be generated by a computer program, such as an animation program. At the same time pixel information can be transmitted. For a single object representation the program would cycle repetitively. More complex three-dimensional shapes could be displayed by sequencing cross-sections of pixel illumination. It is important that the rotation of the moving spiral screen be matched perfectly with the cross-sectional images being displayed on the screen as controlled by the computer program. In one embodiment an animation program can direct which pixels are illuminated on the surface of the screen. When the system is used with an active matrix display which has the ability for individual pixel addressing, such as FEDs described above, a large number of different images can be created.

Other IPMs can be used in place of FEDs or LEDs. For example, in yet another embodiment, a plurality of independently controlled microlasers located on small chips can be utilized. In some further embodiments individual fiber optic strands from a bundle can each be directed to illuminate one of a plurality of translucent points on the display screen. Other equivalent light-producing small elements that can be independently controlled can also be utilized on the screen.

In yet another embodiment a video image is digitized by a computer, and the signals are directed through a lead to the display screen. The image displayed by the light-producing elements on the screen changes depending upon which light sources are directed to be illuminated and depending upon the position of the screen as it rotates within the viewing chamber. Because of persistence of vision, an impression of an image is retained by the observer as the screen rotates. Different colors can also be utilized. If an FED device is used, it can receive a television signal from appropriate circuitry to display a television image with many picture elements or pixels of display included within one FED device.

When utilizing a television image on spiral-shaped television screen member, the screen member can be hard-wired directly to television circuitry 54 which rotates within lower compartment 52 along with spiral screen 40 in upper chamber 50. Rings 56 and 58 on shaft 29 can rotate and carry power and a television video signal, respectively, to television circuitry 54 which provides the image to television screen member 40, from contact with brushes 60 and 62, each respectively receiving input from television signal input 64 and power input 66. Shaft 29 can be rotated by gears 68 and 70 or equivalent means by motor 72 receiving power from power supply 74, the rotational speed of which motor is synchronized with the image production of each pixel 44 on spiral screen 40. Spiral screen 40, as seen in the FIGURE, can be opaque and can be viewed from front 42 of cylindrical chamber 15. Spiral screen 40 can have other types of IPMs 44 thereon, as discussed above. Contact can be made through electrical lines 29 on the shaft, such line(s) running to, for example, an FED by a plurality of brushes carrying the appropriate electric signal to each of such lines. As spiral screen 40 rotates, each IPM 44 on the spiral screen can be illuminated or not, as directed by a television signal or a computer to which each IPM can be interconnected, and images can be produced along the X-Y depth and Z width of spiral screen 40 as it rotates. Spiral screen 40 covers the volume (X,Y,Z) of the chamber by merely rotating. Such rotatable spiral screen can be contoured by at least two radii drawn perpendicular from its axis of rotation where such radii are at a distance from one another along such axis. A screen surface can be defined by extending a screen surface along a plurality of such radii drawn at an angle to one another and spaced apart from one another along such axis in a continuing series, each at a greater angle from a first succeeding one and each higher than the next below, such radii forming the basis for the screen's spiral shape.

The spiral screen can utilize a servo drive motor for framing an anti-roll control. FED technology can be adapted to the spiral screen topography by utilizing small, uniformly-shaped, repeating segments joined together until the full screen is constructed. Each repeating unit can be electrically connected to an underlying thin-film printed circuit to act as the active matrix to power each pixel on the spiral screen Although the present invention has been described with reference to particular embodiments, it will be apparent to those skilled in the art that variations and modifications can be substituted therefor without departing from the principles and spirit of the invention.

I claim:

1. A display device for producing a three-dimensional image, comprising:
   a viewing area having a front, a back and a depth;
   a rotatable spiral screen developed by at least two radii, said screen having a central axis disposed within said viewing area, said radii disposed perpendicular to said central axis, said radii being disposed a distance from one another along said central axis, said screen having a front surface and a rear surface, said front surface of said spiral screen facing said front of said viewing area, said spiral screen rotatable along its central axis;
   means to form an image of a three dimensional object by the emission of light from the surface of said spiral screen using energy from said screen; and
   means to rapidly rotate said spiral screen within said viewing area wherein said image is viewable from the front of said viewing area and said image is produced relative to its position within the depth of said viewing area.

2. The display device of claim 1 wherein said image is formed by a plurality of pixels arrayed on said spiral screen.

3. The display device of claim 2 wherein each of said pixels is an IPM.

4. The display device of claim 1 wherein said front surface of said spiral screen is a television screen.

5. The display device of claim 4 further including:

television circuitry associated with said screen disposed beneath said spiral screen, said circuitry rotatable with said screen;

means through which television input signals are directed to said television circuitry; and means through which said television screen receives display information from said television circuitry.

6. A display for producing a three-dimensional image, comprising:

a viewing area having a front, a back and a depth;

a rotatable spiral screen developed bV at least two radii, said screen having a central axis disposed within said viewing area, said radii disposed perpendicular to said central axis, said radii being disposed a distance from one another along said central axis, said screen having a front surface and a rear surface, said front surface of said spiral screen facing said front of said viewing area, said spiral screen rotatable alone its central axis;

means to form an image by the emission of light from the surface of said spiral screen by a plurality of pixels comprising IPMs arrayed on said spiral screen, wherein each of said IPMs is selected from a group of IPMs consisting of FEDs and laser chips; and means to rapidly rotate said spiral screen within said viewing area and said image is produced relative to its position within the depth of said view in area.

7. The display device of claim 6 wherein said means to form said image includes a computer directing each individual IPM to emit light in a selected array to create a desired image.

8. A method for displaying a three-dimensional real image to a viewer comprising the steps of:

rotating a spiral screen having a surface within a viewing area;

sequentially forming a plurality of images of a three dimensional object on said screen's surface in sequence to said screen's image area's position in said viewing area characterized by said image not being formed by an impinging energy beam but being produced at said screen's surface;

viewing said screen by said viewer in said viewing area; and forming a three-dimensional image in said viewing area by said screen's movement, said three-dimensional image visible to said viewer.

9. The method of claim 8 further including the step of:

forming said plurality of images by positioning a plurality of IPMs on said surface of said screen, each contributing to form a portion of said image.

10. The method of claim 9 further including the step of:

forming said images on a television screen arrayed on said spiral screen.

* * * * *